United States Patent [19]
Leutwyler

[11] 3,741,249
[45] June 26, 1973

[54] BALL VALVE WITH RESILIENT SEAL

[75] Inventor: Kurt Leutwyler, Houston, Tex.

[73] Assignee: Baker Oil Tools, Inc., Los Angeles, Calif.

[22] Filed: Mar. 22, 1971

[21] Appl. No.: 236,929

[52] U.S. Cl............... 137/629, 166/224, 251/160, 251/188, 251/351
[51] Int. Cl............................................ F16k 11/20
[58] Field of Search..................... 137/629; 166/224; 251/160, 161, 181, 188, 192, 210, 351, 352

[56] References Cited
UNITED STATES PATENTS
3,583,442  6/1971  Dollison........................ 137/629 X
3,703,193  11/1972  Raulins........................... 137/629 X Primary Examiner—Robert G. Nilson
Attorney—Bernard Kriegel

[57] ABSTRACT

A ball valve is incorporated in a subsurface shutoff valve for wells. The ball valve is actuated rotatively and longitudinally within its support and effects sealing engagement with a stationary resilient seal by longitudinal movement.

10 Claims, 13 Drawing Figures

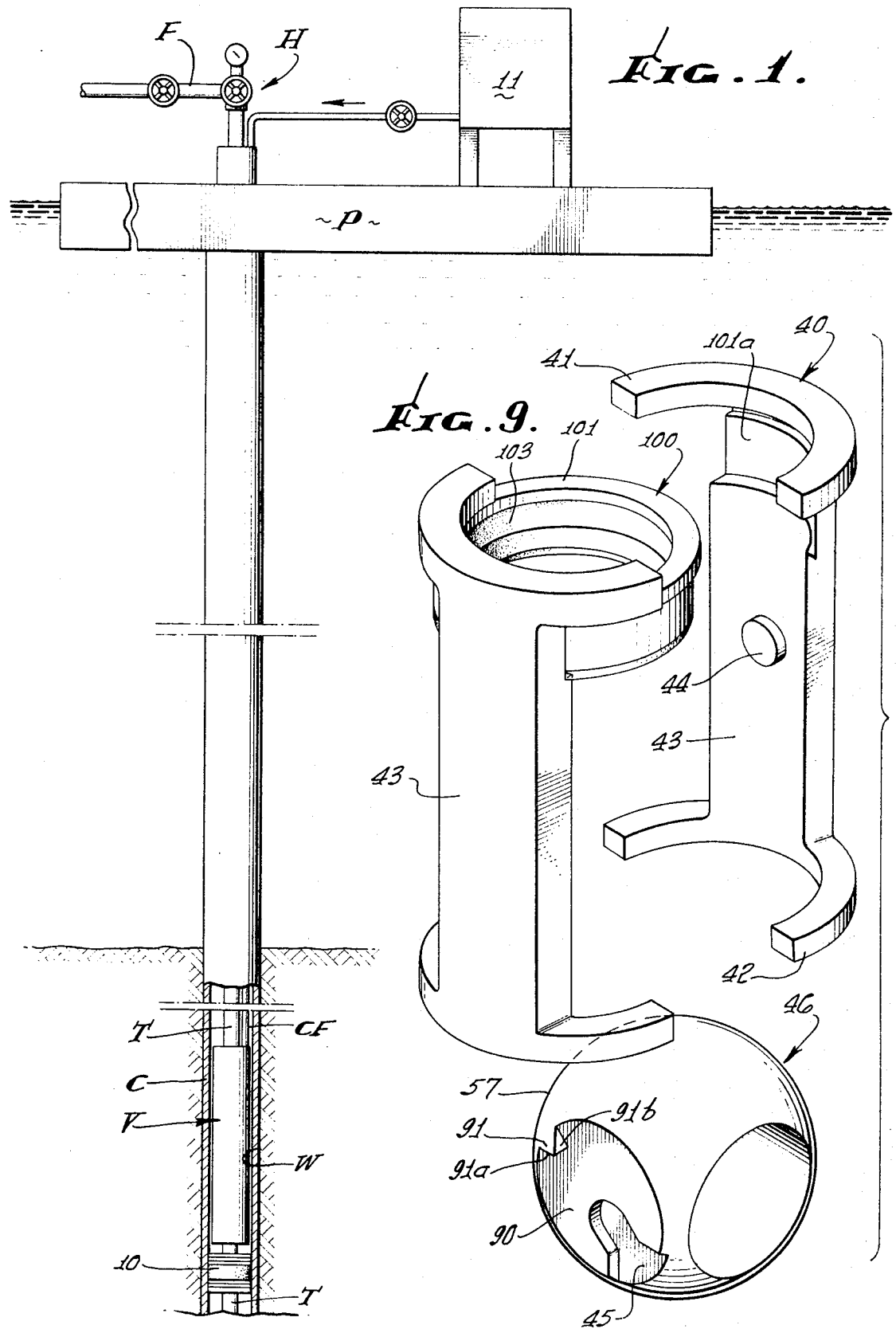

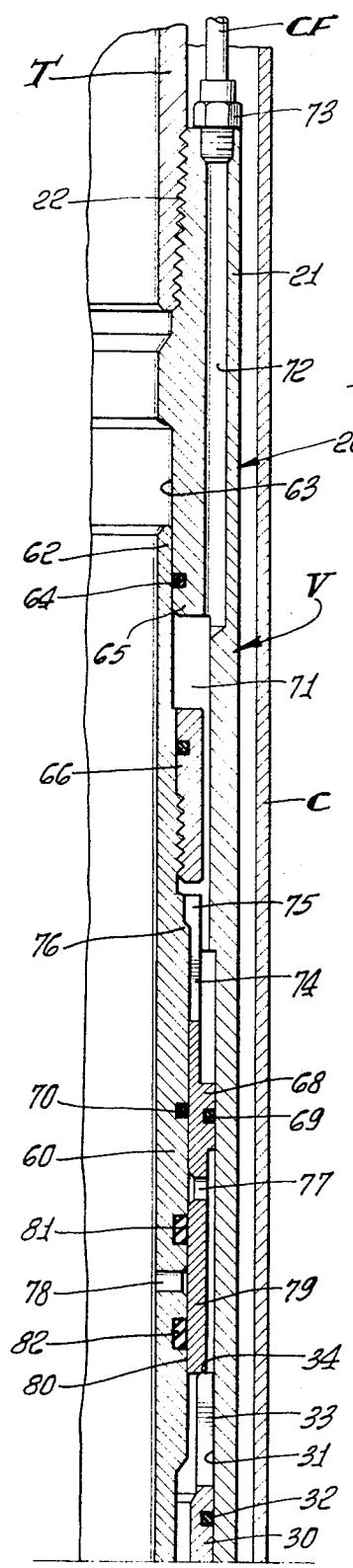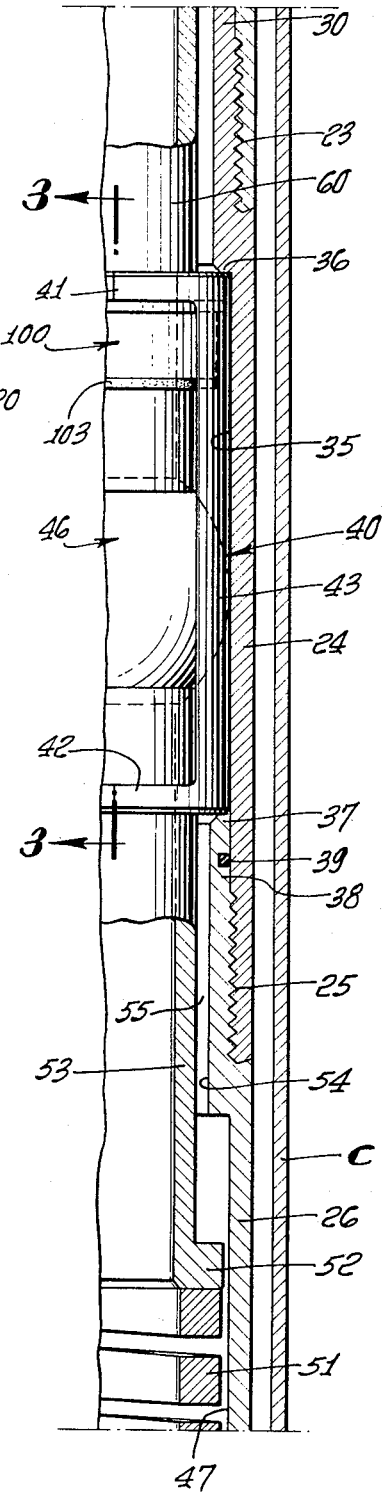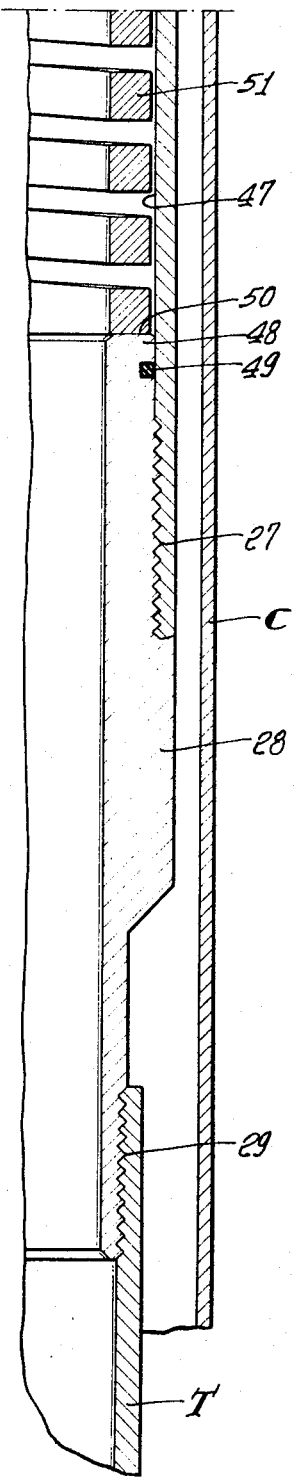

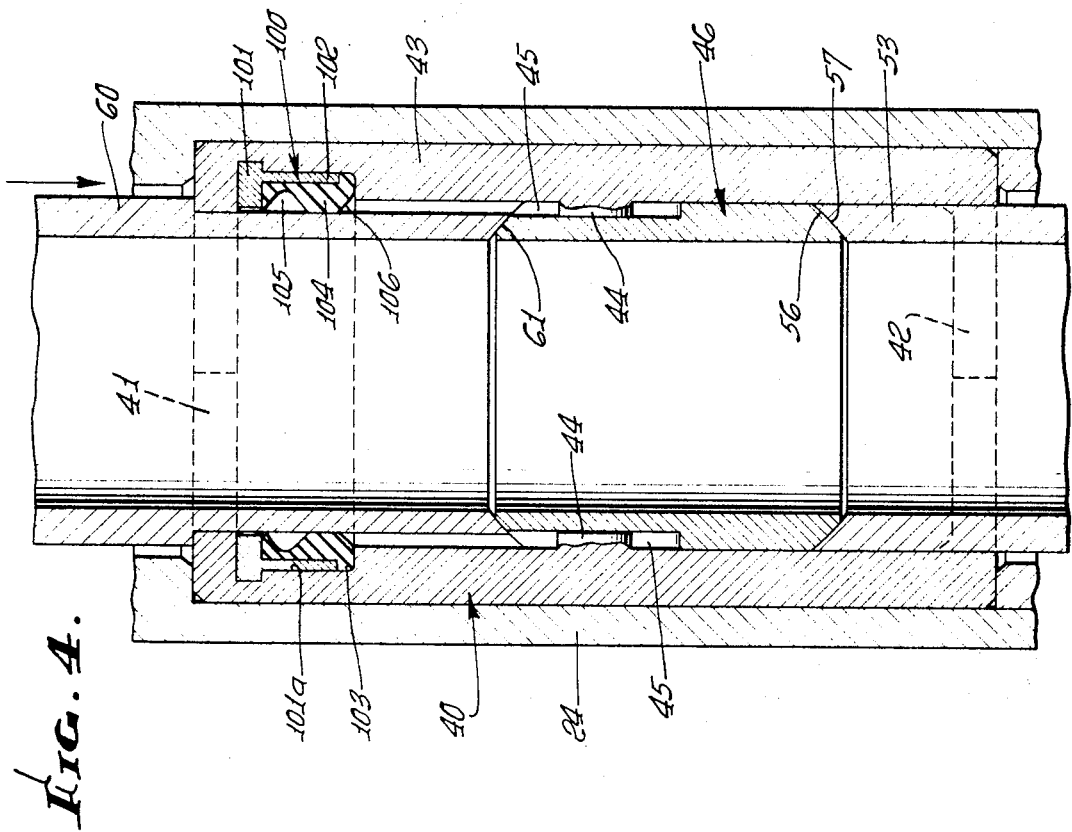
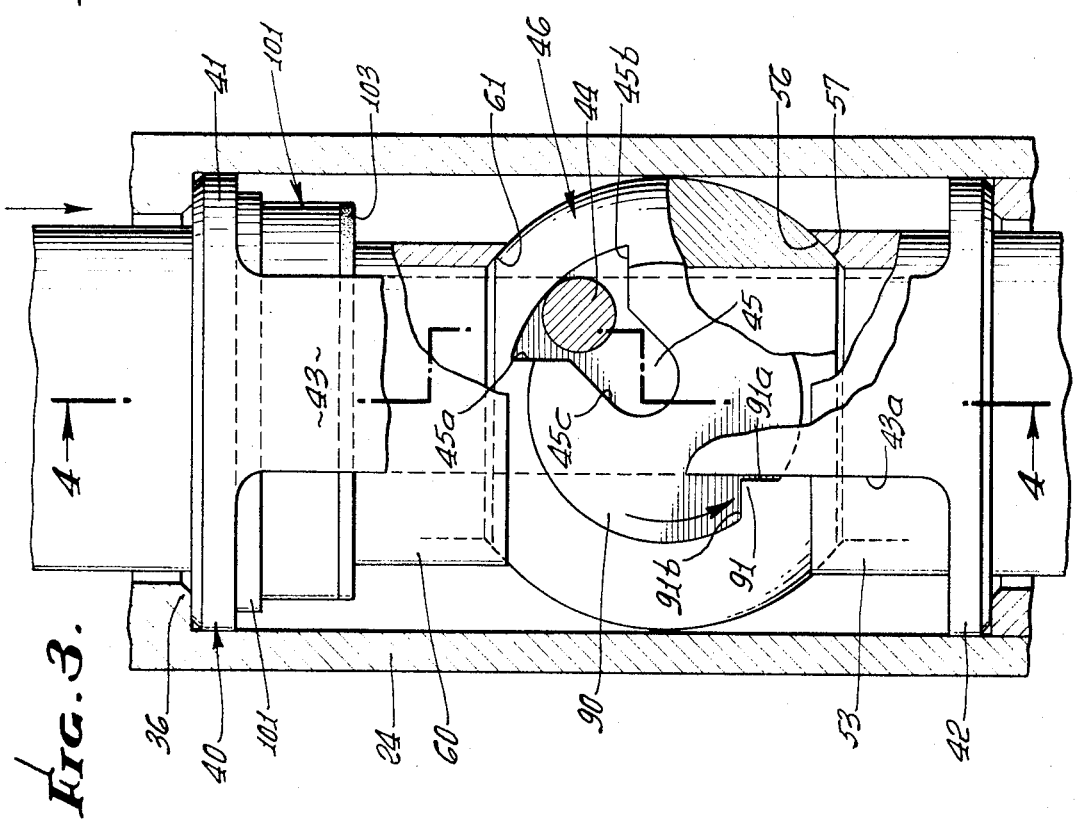

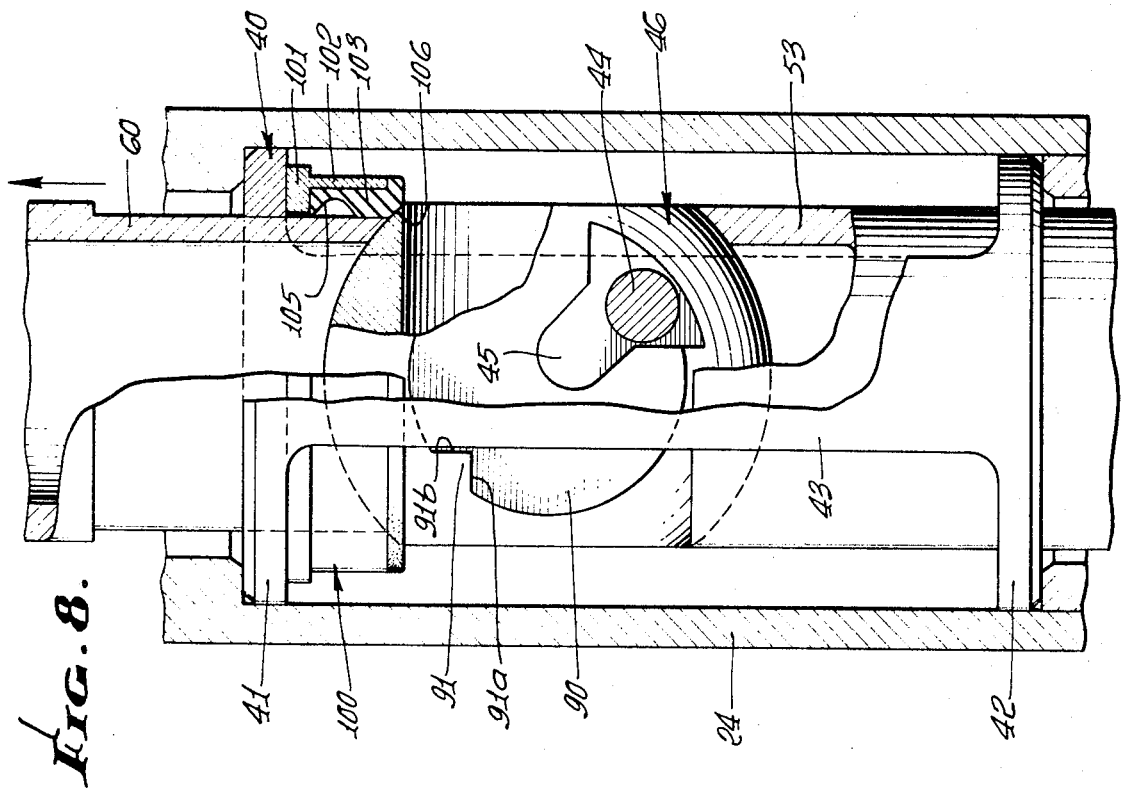
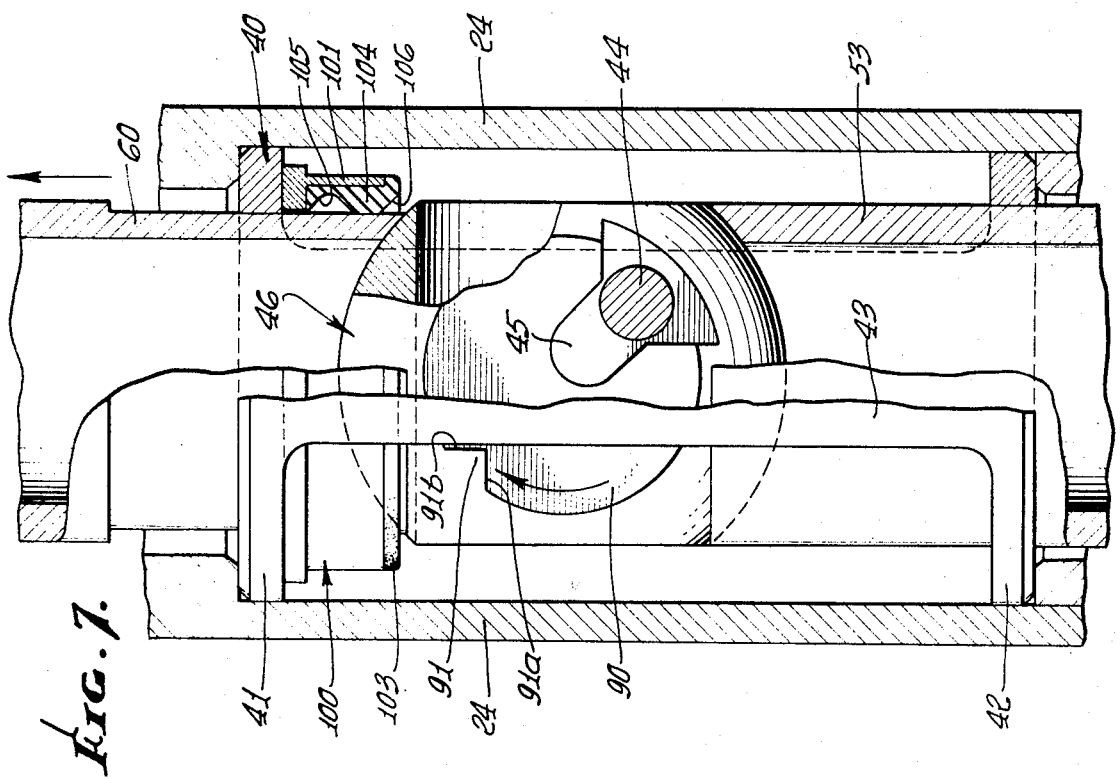

BALL VALVE WITH RESILIENT SEAL

Ball valves have the common characteristic of comprising a ball-like valve member having a flow passage extending diametrically therethrough and the ball is rotated about an axis transverse to the passage, between a first position at which the passage is aligned with the flow passage through the body structure and a second position at which the flow passage in the valve member is closed. The sealing means for such valves are generally either complemental metal-to-metal spherical surfaces on the ball valve and sealing tubes, resilient seals carried by the tubes and engaging the spherical ball surface, or a combination of the metal-to-metal and resilient seals.

However, the metal-to-metal seal is difficult to maintain, particularly in dirty or corrosive fluid media, and the resilient seals, either alone or combined with a metal-to-metal seal, are subject to rapid wear and deterioration caused by rotation of the ball within the resilient seal. Particularly, the wear problem with such rubber seals is acute when the valve is employed in high pressure service, and high velocity flow and relative motion occur past and between the sealing surfaces during opening and closing of the valve.

The present invention provides an improved ball valve of the type wherein the seal is a combined metal-to-metal seal and resilient seal, and wherein to avoid excessive resilient seal wear, the ball is moved linearly from and into sealing contact with the resilient seal and is rotated when disengaged from the resilient seal.

More particularly, the resilient seal is stationary and is carried by the valve support, as distinguished from being carried by the tubular sealing member or members which engage and may cause rotation of the ball valve.

Such a novel valve construction may be advantageously employed in a subsurface well shutoff valve wherein the sealing pressures which prevent leakage of the valve may be substantial and the well fluid flowing through the valve may be dirty or corrosive. Since the resilient seal does not experience high differential pressure and does not experience relative sliding or rotary valve motion, the sealing life is substantially enhanced.

This invention possesses many other advantages, and has other purposes which may be made more clearly apparent from a consideration of a form in which it may be embodied. One form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIG. 1 is a diagrammatic view illustrating an offshore well in which a subsurface automatic shutoff valve has been installed;

FIGS. 2a, 2b and 2c together constitute a longitudinal quarter section showing one form of automatic shutoff valve embodying the invention, with the valve in the open condition, FIGS. 2b and 2c respectively constituting successive downward continuations of FIG. 2a;

FIG. 3 is a detail view in vertical section on the line 3—3 of FIG. 2b;

FIG. 4 is a detail view in vertical section on the line 4—4 of FIG. 3;

Figure 5A:
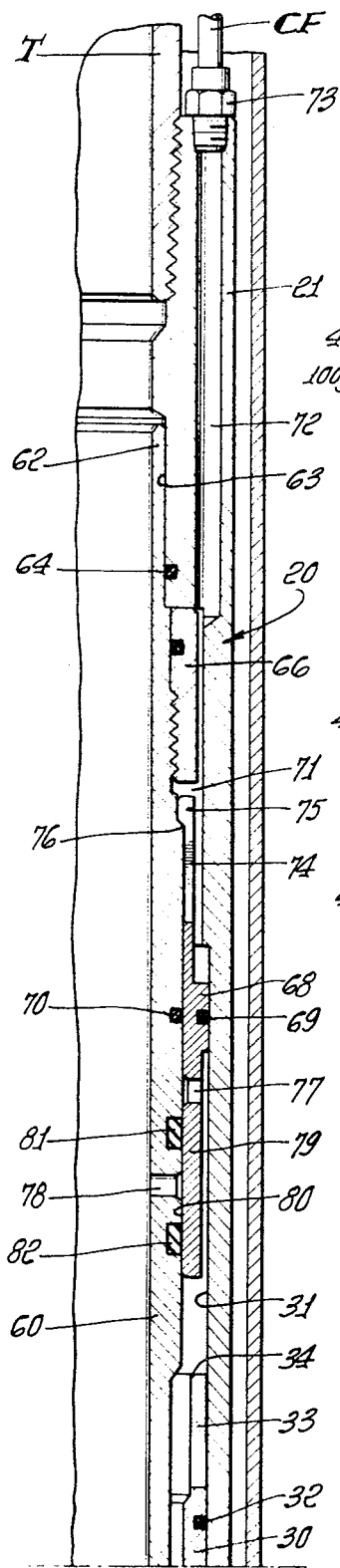
Figure 5B:
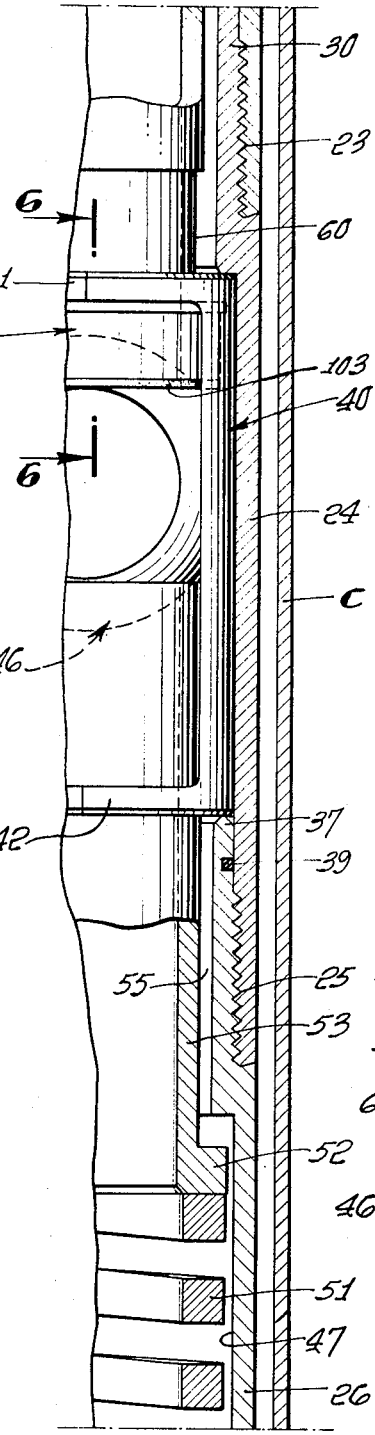
Figure 5C:
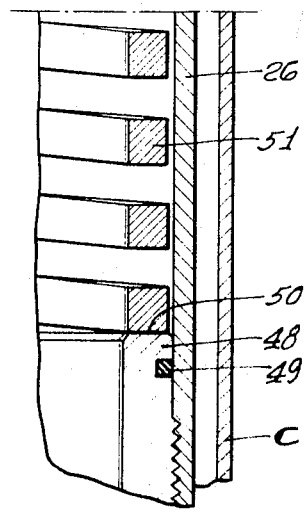
Figure 6:
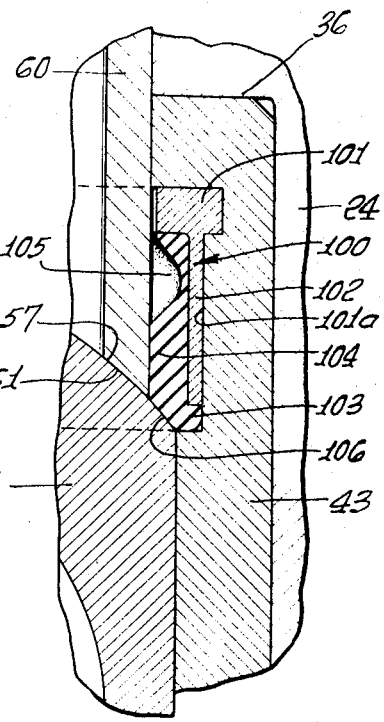

FIGS. 5a, 5b and 5c together constitute a longitudinal quarter section corresponding to FIGS. 2a through 2c, but showing the valve in the closed condition, FIGS. 5b and 5c respectively constituting successive downward continuations of FIG. 5a;

FIG. 6 is a fragmentary detail view in vertical section, as taken on the line 6—6 of FIG. 5b;

FIG. 7 is a view generally corresponding to FIG. 3, showing the valve rotated to a closed position, but before engagement with the resilient seal;

FIG. 8 is a view corresponding to FIG. 7, but showing the valve fully closed and engaged with the resilient seal; and FIG. 9 is an exploded detail in perspective, showing the ball valve, carrier and resilient seal.

As seen in the drawings, referring first to FIG. 1, an automatic shutoff valve assembly V is installed in a string of well production tubing T which extends downwardly through a well casing C which is set in a well bore W. The tubing T and casing C extend upwardly through a body of water from a platform P. On the platform is a conventional valved tubing head H from which a flow line F extends, the flow line being adapted to conduct well fluids to a suitably located reservoir. A packer 10 is set in the casing C and forms a seal between the tubing T and the casing below the valve assembly V and the latter is adapted to remain open, as will later be described, only so long as it is supplied with suitable control fluid pressure from a pressure source 11 through a string of control fluid tubing CF which extends downwardly through the casing C from the pressure source 11 to the valve assembly V.

In this form, the valve assembly comprises an elongated tubular outer body 20 including an upper body section 21 which is threadedly connected at 22 to the lower end of the tubing string T above the valve assembly, the upper body section 21 being threadedly connected at 23 at its lower end to an intermediate body section 24 which extends downwardly and which is threadedly connected at 25 to a lower body section 26, the latter being threadedly connected at 27, at its lower end, to a connector sub 28 which is in turn threadedly connected at 29, at its lower end, to the tubing string T extending downwardly in the well bore below the valve assembly. The intermediate body section 24 has an upwardly extended cylindrical section 30 disposed within a complemental bore 31 in the upper body section 21, and suitable seal means 32 carried by the cylindrical section 30 sealingly engages within the bore 31. Above the seal 32, the cylindrical end 30 has a suitable number of upwardly extended and circumferentially spaced fingers 33 providing an upwardly facing shoulder 34, the purpose of which will be later described. The intermediate body section 24 has an internal bore 35 and a downwardly facing internal shoulder 36 which is opposed by an upwardly facing shoulder 37 provided at the upper end of the lower body section 26. Beneath the shoulder 37, the body section 26 has a cylindrical end section 38 which carries a side ring seal 39 engaged within the bore 35. Interposed between the downwardly facing shoulder 36 and the upwardly facing shoulder 37 is a valve carrier or supporting member 40 which, as best seen in FIG. 9, consists of circumferentially extended upper and lower diametrically split end rings 41 and 42 respectively and a pair of diametrically spaced longitudinally extended valve supporting ribs or bars 43 interconnecting the end rings 41 and 42. The bars 43 have inwardly extended opposing pins 44 each engaged in a slot 45 in the adjacent side of a ball valve member 46, whereby, as will be later more fully described, the ball valve 46 is adapted to be actuated between the open or flowing condition of FIGS. 2a through 2c, and the closed or non-flowing condition of FIGS. 5a through 5c.

The lower body section 26 has an internal bore 47 which receives an upper cylindrical end portion 48 of the connector sub 28, the latter having a side ring seal 49 sealingly engaged in the bore 47, below the upper end surface 50 of the sub 28. This end surface 50 constitutes an abutment or seat for a coiled compression spring 51 which is disposed within the bore 47 and has a diameter within its convolutions preferably greater than the flow passage in the valve assembly.

The spring 51 is a valve actuating spring and seats or abuts at its upper end with a lower end flange or abutment 52 on a lower valve operating and sealing sleeve 53 which is reciprocable within a reduced bore 54 in the lower body section 26 which has longitudinally extended and circumferentially spaced channels 55 to enable the free flow of fluid, as will be later described. At its upper end, the valve operating and sealing sleeve 53 has an annular, spherical seating surface 56 adapted for abutting and sealing engagement with a companion spherical valve surface 57 on the valve member 46.

Reciprocable within the outer body 20 above the valve member 46, is an upper valve actuating and sealing sleeve 60 which has at its lower end a spherical valve engaging and sealing surface 61 engageable with the spherical surface 57 of the valve member 46. The upper valve sleeve 60 extends upwardly in radially inwardly spaced relation within the outer, upper body section 21, and has at its upper extremity a cylindrical end section 62 extending reciprocably into a bore 63 of the outer body section 21, the latter having a side ring seal 64 slidably and sealingly engaging the cylindrical section 62 of the sleeve 60 above a radially inwardly extended cylinder head portion 65 of the body section 21. Provided on the valve sleeve 60, below the cylinder head 65 is a radially outwardly extended piston 66.

Carried by the sleeve 60 within the bore 31 of the body section 21 is a by-pass valve sleeve 67 having an intermediate annular piston section 68 provided with an external seal 69 slidably engaging within the bore 31. An internal seal 70 is carried by the sleeve 60 and slidably engages within the by-pass valve sleeve 67. Thus, it is now apparent that between the annular piston 68 and the cylinder head 65 there is defined a longitudinally extended annular pressure chamber 71 to which control fluid is admitted through an elongated passage 72 in the outer body section 21 which opens into the pressure chamber 71 at the cylinder head 65 and to which the control fluid conduit or tubing CF is connected by s suitable fitting 73. The effective pressure responsive area of the sleeve 60 in the chamber 71 is the difference between outside diameter of the sleeve 60 on which the valve sleeve 67 is disposed and the reduced diameter, upper end 62 of the sleeve 60.

The above-mentioned by-pass valve sleeve 67 is adapted to be normally held in the position shown in FIG. 2a by means of a plurality of upwardly extended, normally inwardly retracted but resiliently outwardly expansible collett or latch fingers 74 which have inwardly extended lugs 75 at their upper end engageable with an outwardly projecting shoulder 76 on the sleeve 60. Beneath the piston section 68, the by-pass valve sleeve 67 has a suitable number of radial by-pass ports 77 which in one position of the sleeve 67, as seen in FIG. 2a, are spaced above a suitable number of radial ports 78 in the sleeve 60, but in a second position, when the latch fingers 74 are released and the by-pass valve sleeve 67 has been shifted downwardly, the ports 77 and 78 are in communication. The lower unported section 79 of the by-pass valve sleeve 67 provides an inner cylindrical surface 80 engaged by upper seal ring means 81 and lower seal ring means 82 between which the ports 78 are disposed, so that, in the normal position of FIG. 2a, well fluid pressure cannot by-pass the valve sleeve 67.

When the valve actuating and sealing sleeve 60 is in the position of FIGS. 2a and 2b, which is a lower position relative to the valve body 20, the valve member 46 is in the open position, and the end sealing surface 61 of the sleeve 60 is biased into engagement with the spherical surface 57 of the valve member 46 by the pressure of control fluid in the chamber 71 acting downwardly on the sleeve 60. This downward force is transmitted through the valve member 46 to the lower valve operating and sealing sleeve 53 through the sealing surface 56 at the upper end of the latter and the spherical surface 57 of the valve member 46 and compresses the spring 51. Under these circumstances, the ball valve member 46 is in the open position, and the relationship of the ball valve actuating pins 44 and the slot 45, previously referred to, is best seen in FIG. 3, it being understood that the ball valve member 46 has identical slots 45 at its opposite sides engaged by diametrically opposite pins. More particularly, the ball valve member 46 on each of its opposite sides has a chordal flat surface 90 adjacent to the diametrically opposite bars 43 of the ball carrier 40. The slot 45 extends radially with respect to the axis of rotation to the ball valve member 46, and in radial alignment with the slot 45, a stop lug 91 projects outwardly from the flat surface 90 and provides a pair of right angularly related stop surfaces 91a and 91b. When the ball valve member 46 is in the position of FIG. 3, the stop surface 91a engages the vertical side wall 43a of the adjacent bar 43, thereby limiting rotation of the valve member 46 in the direction of the arrow to the position at which the valve is open. The stop surface 91b on the stop lug 91 engages the bar surface 43a, as shown in FIG. 8 to limit rotation of the valve member 46 to the position at which the valve is closed. Such rotation between the open and closed positions is caused by longitudinal or vertical movement of the valve member 46 within the carrier 40, the two longitudinal extremes being shown in FIGS. 3 and 8. As previously indicated and as will later be more fully described, the ball member 46 is actuated or shifted longitudinally by longitudinal movement of the upper actuator sleeve 60 and the lower actuator sleeve 53, as indicated by the arrows in FIG. 3. The slot 45 is formed in such a manner as to cause such rotation of the valve member 46 as the latter moves vertically or longitudinally within the carrier 40. Thus, as seen in FIG. 3, the slot 45 is formed in the valve member 46 by opposed walls which are disposed at a right angle to one another and designated 45a and 45b and which respectively are parallel to the stop surfaces 91a and 91b. At the apex of the angle defined between the walls 45a and 45b, the slot opens radially inwardly at 45c. Thus, the relationship between the pin 44 and the wall 45a is such that the ball valve 46 will be rotated from the position of FIG. 8 to the position of FIG. 3 when the valve member 46 moves downwardly relative to the pin 44, and, conversely, the flat wall 45b will engage the pin 44 and rotate the ball valve member from the position of FIG. 3 to the position of FIG. 8 upon upward movement of the valve member 46. However, it will be noted that when the valve member 46 is in the position of FIG. 8, the pin 44 clears the flat wall 45b so as to allow freedom of longitudinal movement of the ball valve 46 after the stop surface 91b engages the bar wall 43a, and correspondingly limited free downward movement of the ball valve 46 is permitted when the ball valve is open, as seen in FIG. 3, and the pin 44 clears the slot wall 45a when the stop surface 91a engages the side wall 43a of the bar 43. Such free or lost motion connection of the ball valve 46 and the rotating pin 44 relieves the connection of damaging forces when the ball valve is in either of its closed or opened positions, and in addition facilitates the use of the resilient seal now to be described.

The ball valve carrier 40 carries beneath the upper split ring portion 41 thereof a resilient seal 100 through which the upper actuator sleeve 60 is reciprocable. This seal 100 comprises a support ring 101 having a cylindrical skirt 102 extending axially therefrom and received in an internal, annular channel 101a formed in the carrier 40 when it is assembled in the valve body. Molded in or bonded in the skirt 102 is a resilient elastomeric element 103 having a main body portion 104 which projects radially inwardly into engagement with the outer periphery of the sleeve 60, the resilient element 103 having a circumferential internal groove 105 above the main body portion 104 and a lower, annular, inclined face 106 which is engageable by the spherical sealing surface 57 of the ball valve 46 when the latter is moved axially upwardly with respect to the carrier 40 into sealing engagement with the seal means 100. As seen in FIGS. 6 and 8, the sealing end surface 61 of the sleeve 60 provides an inner circumferentially continuous metal-to-metal seal with the ball valve 46 and the elastomeric element 103 provides an external circumferentially continuous seal. The metal-to-metal seal between the sleeve 60 and the ball valve 46 is the primary seal, but since such metal-to-metal seals are subject to damage from dirty or corrosive fluids resulting in some leakage, the external resilient seal constitutes a secondary seal which can withstand the minor differential pressure caused by leakage between the metal-to-metal seal, notwithstanding that the spherical surface 57 of the ball valve may be scratched or pitted. In operation, as will be described below, the resilient sealing element 103 is satisfactory and is engaged by the ball valve 46 during the last increment of upward longitudinal movement of the latter with respect to the ball carrier 40, and moreover, disengagement of the ball valve from the resilient seal is effective during initial increment of downward longitudinal movement of the ball valve 46 with respect to the ball carrier 40. The initial increment of such downward movement of the ball valve 46 occurs only after the by-pass valve 67 has been opened to equalize the fluid across the closed ball valve, and therefore, the resilient seal means 100 is not subjected to substantial differential pressure or to substantial fluid flow as the ball valve is being opened. The life of the resilient seal is further enhanced by the fact that the ball valve does not rotate while engaged with the resilient seal means.

In the use of the invention, the tubing string T with the valve assembly V installed therein is run into the well to the desired location, the packer 10 sealing off the annulus between the tubing and the casing C and the control fluid conduit is simultaneously run into the well with the tubing T. Under normal conditions, the valve assembly V will be in the condition shown in FIGS. 5a through 5c and 8, as it is being run into the well, wherein the actuator spring 51 biases the actuator and valve seating sleeve member 53 upwardly into sealing engagement with the ball valve 46, so that the latter is held by the force of the spring 51 in the closed position of FIG. 8. Upward movement of the upper actuator sleeve 60 is limited by engagement of the upper end of the piston 66 in the control fluid pressure chamber 71 with the cylinder head 65, and the ball valve 46 is therefore compressively engaged between the lower actuator sleeve 53 and the upper actuator sleeve 60 under the influence of the spring 51 and the differential pressure caused by fluid in the well acting on the differential pressure responsive area of the lower actuator sleeve 53 when its sealing surface 56 is in sealing engagement with the ball valve 46. The secondary resilient seal means 100 seals against the ball valve surface 57 to prevent leakage between the surfaces 61 and 57 of the sleeve 60 and ball valve 46, respectively.

When it is desired that the subsurface valve be opened to enable the well to be produced, control fluid pressure is introduced into the chamber 71 via the control fluid tubing CF from the source 11. Such control fluid pressure acts on the piston 68 of the by-pass valve sleeve 67 to force the latter downwardly from the position of FIG. 5a. The control fluid pressure acting on the piston 68 overcomes the resilient latch fingers 74 causing them to be cammed outwardly and released from the shoulder 76. When the by-pass valve ports 77 in the valve sleeve 67 and 78 in the actuator sleeve 60 are in registry, fluid communication is established through the longitudinal passages 55 in the lower body section 26 and around the exterior of the ball valve 46, through the open by-pass valve means, and into the tubing T above the closed ball valve 46. Thus, when the fluid in the tubing T is equalized below and above the ball valve 46, shifting of the latter from the closed position to the open position is facilitated and frictional co-engagement of the sealing sleeve surfaces 56 and 61 with the sealing surface 57 of the ball valve 46 is substantially reduced. In addition, there is no substantial differential pressure across the resilient seal means 100 to cause fluid flow and damage to the resilient seal.

Thereupon, to open the ball valve 46, control fluid pressure in the control fluid pressure chamber 71 may be increased, to overcome friction, if necessary, so as to act upon the piston area of the actuator sleeve 60 to force the latter downwardly from the position of FIG. 5a to the position of FIG. 2a. During such downward movement, the by-pass valve 67 is prevented from moving further downwardly by abutting engagement with the ends 44 of the circumferentially spaced stop fingers 33. As the sleeve 60 moves downwardly, the ball valve 46 will be moved correspondingly downwardly, and when the wall 45a of the respective slot 45 contacts the stationary actuator pins 44, the ball valve 46 will then be rotated counterclockwise until the stop surface 91a contacts the stop wall 43a of the ball valve carrier 40, at which time as seen in FIG. 3, the flat wall 45a and the pin 44 are cleared for enabling all of the longitudinal forces to be transmitted from the actuator sleeve 60 through the sealing surfaces 61, 57 and 56 and applied to the spring 51, without applying any of such force to the ball valve rotating pin and slot means. The well may then be produced so long as the pressure in the control fluid pressure chamber 71 causes a downward force on the sleeve 60 which exceeds the opposing upward force caused by the combination of the spring 51 and pressure acting on the lower actuating sleeve 53.

If, for whatever reason, control fluid pressure is reduced, say by reason of damage occurring to the control fluid conduit CF between the valve assembly V and the platform P, or if it is desired, for some other reason, to shut the well in, then the spring 51 and fluid pressure will act upwardly on the lower actuator sleeve 53, overcoming the remaining downward force caused by control fluid pressure. As the actuator sleeve 53 moves the ball valve 46 upwardly, the pins 44 will contact the respective flat walls 45b of the slots 45, to cause rotation of the valve 46 in a clockwise direction, from the position of FIG. 7 to the position of FIG. 8, until the stop surface 91b on the ball valve 46 contacts the stop surface 43a on the ball carrier 40, and thereafter the closed ball valve and the respective actuator sleeves 53 and 60 may move upwardly until the piston 66 contacts the cylinder head 65, and thereupon the ball valve 46 will be compressively engaged between the actuator sleeves 53 and 60 under the influence of the spring 51 and the well fluid pressure below the valve assembly, and the resilient sealing member 103 will be in resiliently deformed sealing contact with the ball surface 57.

I claim:

1. In a subsurface shutoff valve for wells adapted to be supported in a well fluid production pipe: an elongated outer tubular body; an elongated inner tubular assembly including an upper sleeve and a lower sleeve; a ball valve between said sleeves and having a flow passage therethrough; said ball valve and said sleeves having complemental spherical sealing surfaces; a support for said ball fixed in said outer body; supplemental resilient seal means carried by said support and sealingly engageable with said spherical surface of said ball in radially spaced relation to said sealing surface of one of said sleeves; cooperable means on said ball and said support for rotating said ball between first and second positions at which said flow passage is open and closed, respectively, in response to longitudinal movement of said sleeves and said ball valve in opposite directions in said outer body; said upper sleeve and said outer body defining a chamber for control fluid pressure; said upper sleeve having means responsive to the pressure of control fluid in said chamber for moving said sleeves and said ball valve downwardly; said lower sleeve having means responsive to the pressure of well fluid for moving said sleeves and said ball valve upwardly; and by-pass valve means openable in response to the pressure of control fluid in said chamber to equalize fluid pressure across said ball valve when said ball valve is in said second position to relieve frictional coengagement of said complemental sealing surfaces.

2. In a subsurface shutoff valve as defined in claim 1, said means for rotating said ball including means for enabling bodily longitudinal movement of said ball with respect to said body during the final increment of movement of said ball to said first and second positions.

3. In a subsurface shutoff valve as defined in claim 1, said means for rotating said ball including means for enabling bodily longitudinal movement of said ball with respect to said body during the final increment of movement of said ball to said first and second positions, comprising cooperative pin and pin engaging surfaces on said support and said ball for rotating said ball between said first and second positions.

4. In a subsurface shutoff valve as defined in claim 1, said means for rotating said ball comprising pins on said support, and walls on said ball engageable with said pins for rotating said ball between said first and second positions responsive to longitudinal movement of said ball.

5. In a subsurface shutoff valve as defined in claim 1, said means for rotating said ball comprising pins on said support, and walls on said ball engageable with said pins for rotating said ball between said first and second positions responsive to longitudinal movement of said ball, said pins and walls clearing upon rotation of said ball to either of said position to enable further non-rotative longitudinal movement of said ball.

6. In a subsurface shutoff valve as defined in claim 1, said means for rotating said ball comprising pins on said support, and walls on said engageable with said pins for rotating said ball between said first and second positions responsive to longitudinal movement of said ball, and stop means on said ball and said support for limiting rotation of said ball to said first and second positions.

7. In a subsurface shutoff valve as defined in claim 1, said means for rotating said ball comprising pins on said support, and walls on said ball engageable with said pins for rotating said ball between said first and second positions responsive to longitudinal movement of said ball, and stop means on said ball and said support for limiting rotation of said ball to said first and second positions, said pins and walls clearing upon rotation of said ball to either of said position to enable further non-rotative longitudinal movement of said ball.

8. In a subsurface shutoff valve as defined in claim 1, said supplemental resilient seal means comprising a carrier ring connected with said support, and a resilient annular body in said ring and having portions engaging said one of said sleeves and said spherical surface of said ball.

9. In a ball valve assembly: an elongated body having a flow passage therethrough, a ball valve in said passage having a port therethrough, operating means for rotating said ball valve between a first position in which said port is aligned with said passage and a second position at which said ball closes said passage, means defining a pair of opposed annular primary sealing surfaces engaging opposite sides of said ball valve in face-to-face sealing engagement, and a secondary annular resilient seal spaced radially outwardly from one of said primary sealing surfaces and engaged with said ball, and means for moving said ball longitudinally of said passage and from engagement by said resilient seal before rotation of said ball between said positions.

10. In a ball valve assembly as defined in claim 9, actuator sleeves in said body at opposite sides of said ball and having said primary sealing surfaces on opposing ends of said sleeves, means for moving said sleeves and said ball longitudinally in said body, and said means for rotating said ball including cooperable means on said ball and said body.

* * * * *